US011954182B2

(12) United States Patent
Onishi

(10) Patent No.: US 11,954,182 B2
(45) Date of Patent: Apr. 9, 2024

(54) CLOUD MANAGEMENT SERVER, CLOUD SYSTEM, AND RECORDING MEDIUM

(71) Applicant: BUFFALO INC., Nagoya (JP)

(72) Inventor: Tatsuya Onishi, Nagoya (JP)

(73) Assignee: BUFFALO INC., Nagoya (JP)

( * ) Notice: Subject to any disclaimer, the term of this patent is extended or adjusted under 35 U.S.C. 154(b) by 268 days.

(21) Appl. No.: 17/688,905

(22) Filed: Mar. 8, 2022

(65) Prior Publication Data

US 2022/0292165 A1 Sep. 15, 2022

(30) Foreign Application Priority Data

Mar. 15, 2021 (JP) .................................. 2021-041894

(51) Int. Cl.
*G06F 21/10* (2013.01)
*G06F 21/60* (2013.01)

(52) U.S. Cl.
CPC .......... *G06F 21/105* (2013.01); *G06F 21/602* (2013.01); *G06F 21/1077* (2023.08)

(58) Field of Classification Search
CPC ... G06F 21/105; G06F 21/602; G06F 21/1077
See application file for complete search history.

(56) References Cited

U.S. PATENT DOCUMENTS

| 2011/0131134 A1* | 6/2011 | Ferris | G06Q 10/087 709/224 |
| 2014/0182001 A1* | 6/2014 | Matsumoto | G06F 21/10 726/31 |
| 2015/0020179 A1* | 1/2015 | Yokoyama | H04L 63/08 707/827 |
| 2016/0210709 A1* | 7/2016 | Uchida | G06F 21/10 |

FOREIGN PATENT DOCUMENTS

JP 2013-58101 A 3/2013

* cited by examiner

*Primary Examiner* — Ayoub Alata
(74) *Attorney, Agent, or Firm* — XSENSUS LLP

(57) ABSTRACT

A cloud management server comprises processing circuitry configured to access a device database storing information identifying a storage device in association with information identifying an owner thereof; access a license database storing license information of a license for a cloud storage, information identifying a license subscriber of the license, and information identifying a license sharer; receive setting information about a first license from a first license subscriber; refer to the device database to acquire information identifying a first storage device; set an update authority of the setting information to at least one of the first license subscriber and a first license sharer; and receive update instructions of the setting information, to refer to the update authority of the setting information, to confirm that the update instructions are given by the first license subscriber or the first license sharer having the update authority, and update the setting information.

8 Claims, 7 Drawing Sheets

FIG. 2

| ORGANIZATION ID | USER NAME | AUTHENTICATION INFORMATION | ... |
|---|---|---|---|
| aaaa | bbbb | cccc | ... |
| dddd | eeee | ffff | ... |
| ⋮ | ⋮ | ⋮ | |

| ORGANIZATION ID | LICENSE (L) | VALID/INVALID (V) | SHARER (P) |
|---|---|---|---|
| aaaa | pppp ... | VALID | xxxx |
| dddd | qqqq ... | VALID | yyyy |
| ⋮ | ⋮ | ⋮ | ⋮ |

42

CLOUD MANAGEMENT SERVER, CLOUD SYSTEM, AND RECORDING MEDIUM

CROSS-REFERENCE TO RELATED APPLICATIONS

This application is based on and claims priority under 35 USC 119 from Japanese Patent Application No. 2021-041894, filed on Mar. 15, 2021, the contents of which are incorporated herein by reference.

TECHNICAL FIELD

The present disclosure relates to a cloud management server, a cloud system, and a recording medium.

BACKGROUND

In recent years, the use of a cloud service has been promoted. For example, JP2013-58101A discloses a technology of relaying access to data on a cloud by a cloud management server configured to execute a variety of control processing relating to cloud computing.

However, in a cloud service, a user may use a plurality of services provided by a plurality of service providers. In this case, subscription management of services is complicated. Specifically, burdens of a configuration for backing up data on a device such as a NAS onto an external cloud storage and of management of license validity for the cloud storage increase. On the other hand, if an owner of the device entrusts management of the device to a third party, various problems, such as leakage of data on the cloud storage, may arise.

An object of the present disclosure is to provide a cloud management server, a cloud system, and a recording medium that are capable of reducing management burdens for using a cloud service.

SUMMARY

The present disclosure provides a cloud management server, comprising: processing circuitry configured to access a device database storing information identifying a storage device in association with information identifying an owner of the storage device; access a license database associatively storing license information of a license for a cloud storage that is a backup destination of data in the storage device, information identifying a license subscriber of the license, and information identifying a license sharer who uses the cloud storage; receive setting information about a first license from a first license subscriber; refer to the device database to acquire information identifying a first storage device owned by the first license subscriber or owned by a first license sharer associated with the first license subscriber; set an update authority of the setting information to at least one of the first license subscriber and the first license sharer; and receive update instructions of the setting information, to refer to the update authority of the setting information, to confirm that the update instructions are given by the first license subscriber or the first license sharer having the update authority, and update the setting information.

BRIEF DESCRIPTION OF DRAWINGS

Exemplary embodiments of the present disclosure will be described in detail based on the following figures, wherein:

FIG. 2 shows a content example of a user database used by a cloud management server according to the embodiment of the present disclosure;

FIG. 3 shows a content example of a license database used by the cloud management server according to the embodiment of the present disclosure;

DETAILED DESCRIPTION

Figure 1:
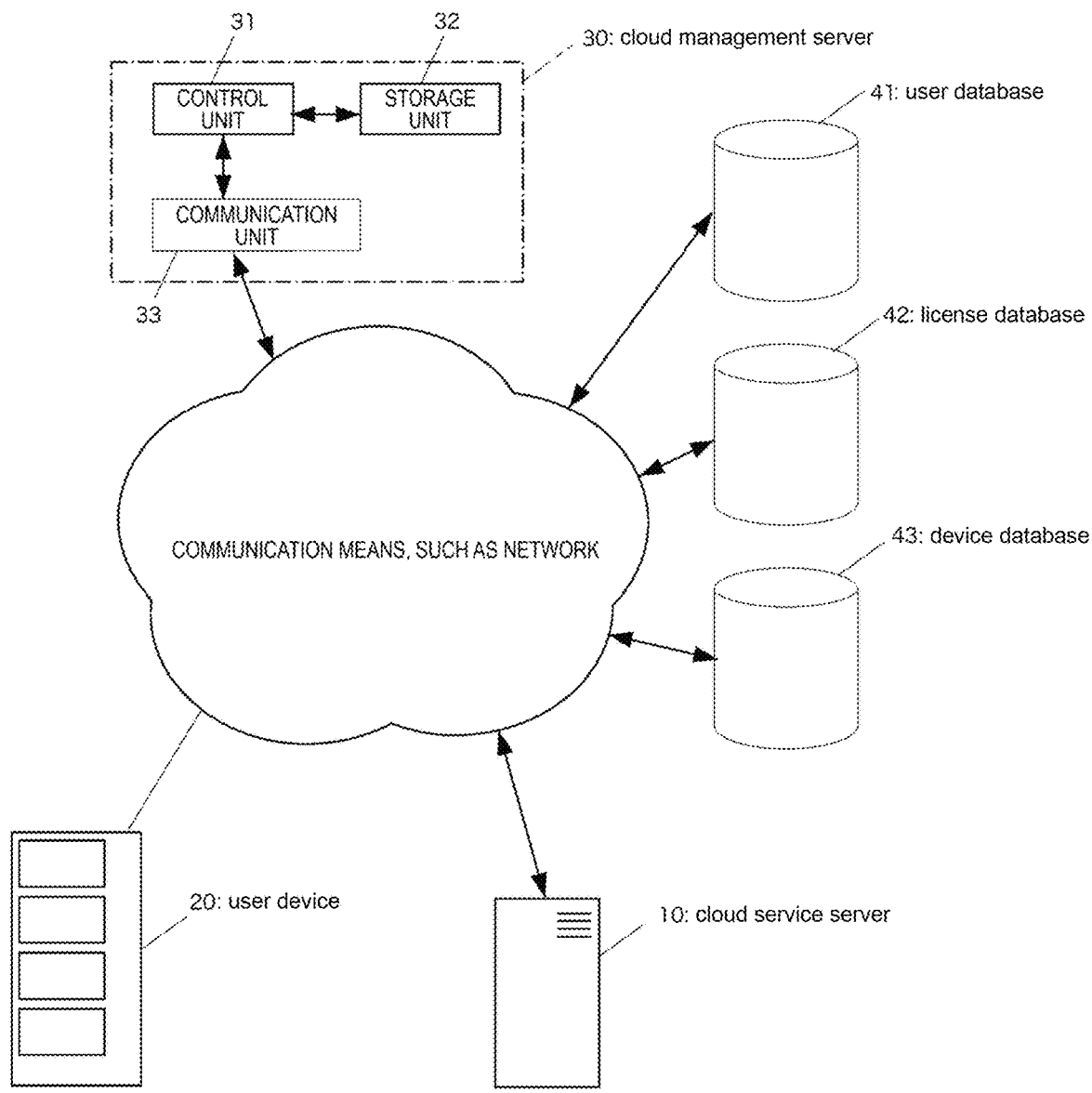
FIG. 1 is a block diagram showing a configuration example of a cloud system according to an embodiment of the present disclosure.

An embodiment of the present disclosure will be described with reference to the drawings. As shown in FIG. 1, a cloud system 1 according to an embodiment of the present disclosure includes a cloud service server 10, a user device 20, and a cloud management server 30 that are connected to each other via a communication means, such as a network.

The cloud service server 10 is, for example, a server configured to provide a storage service. The storage service can be used, for example, for backing up local data. The following description assumes that the storage service is managed by an organization S providing a cloud service.

In the present embodiment, the user device 20 is, for example, a storage device, such as a network-attached storage (NAS), and is distributed to an organization A, such as a company owning the user device 20. In the present embodiment, the user device 20 is configured to use the cloud service server 10 as a backup destination. A configuration and the like for using the cloud service server 10 as the backup destination will be described later.

In the present embodiment, the user device 20 is configured to access the cloud management server 30 every predetermined timing (for example, every time a predetermined time arrives) to check whether or not the cloud management server 30 has setting information, update information, or the like addressed to the user device 20. When there is setting information, update information, or the like addressed to the user device 20, the user device 20 acquires the information to apply content of the acquired information to its own configuration.

Whether or not the information held by the cloud management server 30 is addressed to the user device 20 may be determined based on whether or not the information is associated with information unique to the user device 20, such as a serial number of the user device 20 and a MAC address of a network interface of the user device 20.

In the present embodiment, the cloud management server 30 is installed and managed by an organization B that is a management company (a system builder or the like). As shown in FIG. 1, the cloud management server 30 is configured with a server including a control unit 31, a storage unit 32, and a communication unit 33. The server includes, for example, a processor and a storage device, such as a memory.

The control unit 31 is configured to operate according to a program stored in the storage unit 32 and to receive setting information about a license from a user of an organization subscribing to the license. In addition, the control unit 31 is configured to refer to a device database 43, which holds information about the user device 20, to acquire, for example, information identifying the user device 20 owned by the license subscriber. Further, the control unit 31 is configured to set an update authority of setting information about a license in association with information identifying an organization subscribing to the license.

When the control unit 31 receives update instructions of setting information about a license, the control unit 31 refers to an update authority of the setting information relating to the update instructions to check whether or not the update instructions are from a license subscriber or the like having the update authority. When it is determined that the update instructions are from a person having the update authority, the control unit 31 performs update processing of the setting information about the license. The operation of the control unit 31 will be described in detail later.

The storage unit 32 includes a memory device, a disk device, or the like, and is configured to hold a program executed by the control unit 31. The program may be provided in the storage unit 32 with a non-transitory computer-readable recording medium or via the network. The storage unit 32 is also configured to function as working memory of the control unit 31.

In the present embodiment, the device database 43, in which the control unit 31 holds information about the user device 20, and/or a license database 42, in which the control unit 31 registers information about a license, may be stored in the storage unit 32.

However, the device database 43 and/or the license database 42 may be stored in another server accessible via the network than the cloud management server 30. That is, the device database 43 and the license database 42 have only to be accessible from the cloud management server 30.

The communication unit 33 is, for example, a network interface or the like and is configured to transmit and receive various data via the network according to instructions input from the control unit 31. In addition, the communication unit 33 is configured to output, to the control unit 31, data transmitted via the network to the cloud management server 30.

The functionality of the control unit 31, the storage unit 32, and the communication unit 33 disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Databases Used by Cloud Management Server

In the present embodiment, the databases used by the cloud management server 30 include a user database 41, the license database 42, and the device database 43, as shown in FIG. 1.

In the user database 41, as shown in FIG. 2, a user name, authentication information (a password or the like), and the like are stored in association with information (organization ID) identifying an organization.

As shown in FIG. 3, in association with an organization ID, the license database 42 stores: license information (L) identifying a license whose subscriber has the organization ID; information (V) indicating whether the license is valid or invalid; and information (P) identifying a sharer of the license, as setting information.

In the present embodiment, a subscriber of a license may set a sharer of the license. For example, in the above example, a license subscriber may not be the organization A, which owns the user device 20, but another organization C entrusted to manage the user device 20 by the organization A than the organizations A, B. and S. In this case, the organization C may set, as a license sharer, the organization A, which is to receive a service using the license. In this case, in association with an organization ID identifying the organization C, the license database 42 stores an organization ID identifying the organization A, which is the license sharer, as information (P) identifying a license sharer. If a license sharer is not set, the information (P) identifying a license sharer may be left blank.

License information (L) includes information about a license for using the cloud service server 10. For example, in order to identify a license, license information (L) includes: license identification information unique to the license, information (URL or the like) identifying an access destination for a subscriber or sharer of the license to receive a service of the cloud service server 10; authentication information for access; and the like.

The device database 43 is configured to store associatively information (organization ID) identifying an organization owning the user device 20 and information identifying the user device 20 owned by the organization. The information identifying the user device 20 is information unique to the user device 20, such as the serial number of the user device 20 and the MAC address of the network interface of the user device 20.

Functional Configuration of Cloud Management Server

Figure 4:
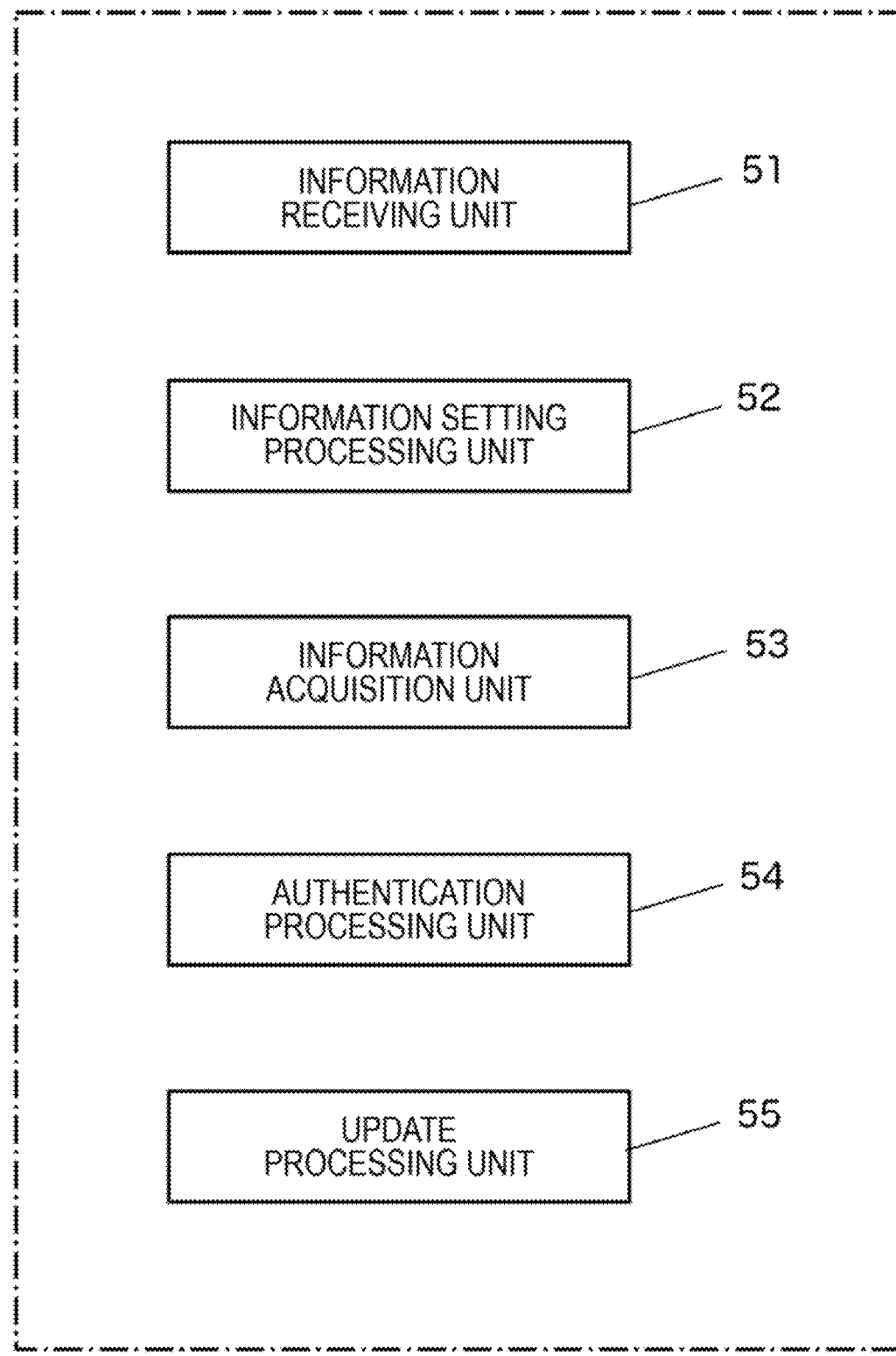
FIG. 4 is a functional block diagram of a control unit of the cloud management server according to the embodiment of the present disclosure.

Operation of the control unit 31 of the cloud management server 30 of the present embodiment will be described. As shown in FIG. 4, the control unit 31 includes an information receiving unit 51, an information setting processing unit 52, an information acquisition unit 53, an authentication processing unit 54, and an update processing unit 55.

The information receiving unit 51 is configured to refer to the user database 41 or the like to receive setting information about a license from a user of an authenticated organization (license subscriber). The setting information about a license includes license information (L), information (P) identifying a license sharer, and the like. The setting information about a license may further include information identifying the user device 20 using the license.

When the information receiving unit SI receives instructions, from a user of an authenticated organization, to register the user device 20 owned by the authenticated organization, the information receiving unit 51 stores information identifying the user device 20 relating to the instructions in association with information identifying the authenticated organization.

The information setting processing unit 52 is configured to register information about a license in the license database 42 based on the information received by the information receiving unit 51. Specifically, the information setting processing unit 52 is configured to set, as a license subscriber, a source of the setting information about the license and to store associatively an organization ID of the source, license information (L) received, and information (P) received specifying a license sharer in the license database 42.

If the information receiving unit 51 receives setting information about license information (for example, license identification information) overlapping with license information (L) already stored in the license database 42, the information setting processing unit 52 overwrites the information already stored with the setting information received to store associatively the organization ID of the license subscriber, which is the source of the setting information, the license information received, and the information received identifying a license sharer.

In the present embodiment, an update authority of setting information about a license is set to at least one of a subscriber and a sharer of the license. Specifically, when information setting processing unit 52 stores (or overwrites) setting information about a license in the license database 42, the information setting processing unit 52 may associatively store, in the license database 42, information (setting of the update authority) indicating that a subscriber or a sharer of the license identified by the stored information has the update authority.

The information setting processing unit 52 may be configured to transmit setting information about a license to the user device 20. In the present embodiment, when setting information about a license received by the information receiving unit 51 includes information identifying the user device 20, the information setting processing unit 52 holds, in association with the information identifying the user device 20, license information (L) included in the setting information about the license with the information (L) accessible from the user device 20 according to a predetermined protocol (HTTP or the like).

In this case, when the information setting processing unit 52 receives a request for license information (L) from the user device 20, the information setting processing unit 52 checks whether or not the information setting processing unit 52 holds the license information (L) associated with information identifying the user device 20, which made the request. If so, the information setting processing unit 52 transmits the license information (L) to the user device 20, which made the request.

However, how the information setting processing unit 52 provides the license information (L) is not limited thereto as long as the user device 20 can store information such as the license information (L).

When the information acquisition unit 53 receives information identifying a license subscriber from the authentication processing unit 54 to be described later, the information acquisition unit 53 accesses the device database 43, refers to registered information, and acquires information identifying the user device 20 that is owned by a license subscriber identified by the information input from the authentication processing unit 54 or owned by a license sharer associated with the license subscriber in the license database 42.

Specifically, the information acquisition unit 53 receives an organization ID identifying a license subscriber from the authentication processing unit 54, accesses the device database 43, and acquires information associated with the organization ID. The information acquisition unit 53 checks whether or not the information identifying the user device 20 associated with the organization ID has been acquired. If the information identifying the user device 20 has been acquired, the information acquisition unit 53 outputs the acquired information to the authentication processing unit 54.

On the other hand, if the information identifying the user device 20 associated with the input organization ID has not been acquired, the information acquisition unit 53 accesses the license database 42 to acquire information identifying a license sharer associated with the organization ID. If the information identifying the license sharer associated with the organization ID has not been acquired, the information acquisition unit 53 informs the authentication processing unit 54 that an error occurred.

If the information for identifying the license sharer associated with the input organization ID has been acquired, the information acquisition unit 53 accesses the device database 43, acquires information associated with the acquired information (an organization ID of the license sharer), and outputs the acquired information to the authentication processing unit 54. If there is a plurality of pieces of information identifying license sharers associated with the input organization ID, the information acquisition unit 53 acquires information associated with each piece of the information in the device database 43 and outputs the acquired information to the authentication processing unit 54.

When there is no information associated with the organization ID of the license sharer (with any one of the organization IDs of the license sharers) in the device database 43, the information acquisition unit 53 informs the authentication processing unit 54 that an error occurred.

When the authentication processing unit 54 receives update instructions of setting information are received, for example, via the network, the authentication processing unit 54 confirms an organization of a user giving the update instructions. The update instructions of setting information includes original license information (L) and update license information (L').

The authentication processing unit 54 then refers to the license database 42 to load an update authority of original setting information about a license relating to the update instructions. The authentication processing unit 54 checks whether the organization is a license subscriber or a license sharer who has an update authority of the setting information about the license based on the loaded update authority.

If the organization of the user giving the update instructions is the license subscriber or the license sharer who has the update authority of the setting information about the license relating to the update instructions, the authentication processing unit 54 outputs information of the subscriber of the license relating to the update instructions to the information acquisition unit 53 and acquires, from the information acquisition unit 53, information identifying the user device 20 using the license relating to the update instructions. When the authentication processing unit 54 acquires the information identifying the user device 20, the authentication processing unit 54 outputs the acquired information and the information received together with the update instructions to the update processing unit 55.

If the authentication processing unit 54 is informed of an error by the information acquisition unit 53, the authentication processing unit 54 informs, of the error, the user giving the update instructions of the setting information.

When the update processing unit 55 receives the information identifying the user device 20 and the original license information (L) and the update license information (L'), which have been received together with the update instructions, from the authentication processing unit 54, which has received the update instructions of the setting information, the update processing unit 55 starts update processing.

When the update processing unit 55 starts the update processing, the update processing unit 55 instructs the user device 20 identified by the information acquired by the authentication processing unit 54 to update a license.

The update processing unit 55 may instruct the user device to update the license with the update license information (L'), which is required for the update of the license, accessible from the user device 20 in association with the information identifying the user device 20. In this case, when the update processing unit 55 receives a request for the update license information (L') from the user device 20, the update processing unit 55 checks whether or not the update processing unit 55 holds the license information (L) associated with the information identifying the user device 20, which made the request. If it is determined that the update processing unit 55 holds the license information (L), the update processing unit 55 transmits the license information (L) to the user device 20, which made the request.

In this case, when information addressed to the user device 20 acquired from the cloud management server 30 is the (update) license information (L'), the user device 20 overwrites the current license information (L) with the (update) information (L') to update the license information (L). When the user device 20 succeeds in updating the license information (L), the user device 20 informs the cloud management server 30 of the success. If the user device 20 fails in updating the license information (L), the user device 20 informs the cloud management server 30 of the failure.

When the update processing unit 55 of the cloud management server 30 receives information of the update result (the success or the failure) of the license information (L) from the user device 20, to which the update instructions of the license has been given, the update processing unit 55 informs the user (that is, a source of the update request), who has given the update instructions, of the update result of the license.

If the update result of the license information (L) received from the user device 20 is successful, the update processing unit 55 searches the license database 42 for information associated with the original license information (L) to overwrite the original license information (L) in the searched information with the update license information (L), thereby updating content of the license database 42.

Confirmation of Validity of License Information

The control unit 31 of the cloud management server 30 of the present embodiment is configured to refer sequentially to license information (L) stored in the license database 42 every predetermined timing to check whether a license identified by the license information (L) is valid or invalid by accessing the server 10 of the organization providing a cloud management service corresponding to the license information (L). The control unit 31 is configured to store the checked validity in the license database 42 in association with the corresponding license information (L), thereby updating the license database 42.

The control unit 31 is configured to receive a predetermined inquiry (license inquiry) for confirming whether a license is valid from the outside, for example, the user device 20. The control unit 31 is configured to load, from the license database 42, information (V) indicating validity associated with the license (which may be identified by license identification information included in license information (L)) that is a target of the received inquiry to inform the user device 20, which is a source of the inquiry, of the loaded information (V).

The control unit 31 may be configured to acquire information identifying the user device 20 from the user device 20, which is the source of the inquiry, to refer to the device database 43, and to determine whether an owner of the user device 20 associated with the acquired information is a subscriber or a sharer of a license that is a target of the inquiry. The control unit 31 may be configured to provide the source of the inquiry with the information (V) indicating validity of the license only if the owner of the user device 20, which is the source of the inquiry, is the subscriber or the sharer of the license that is the target of the inquiry.

Permission Setting of Data Provision

The control unit 31 of the present embodiment preferably has the following functional configuration. When the user device 20 is a storage device whose files or the like are to be backed up onto the cloud service server 10 as described above, if a subscriber or a sharer of a license relating to the cloud service server 10 is different from an owner of the user device 20, the data backed up is unpreferably provided to a person other than the owner of the user device 20.

Figure 5:
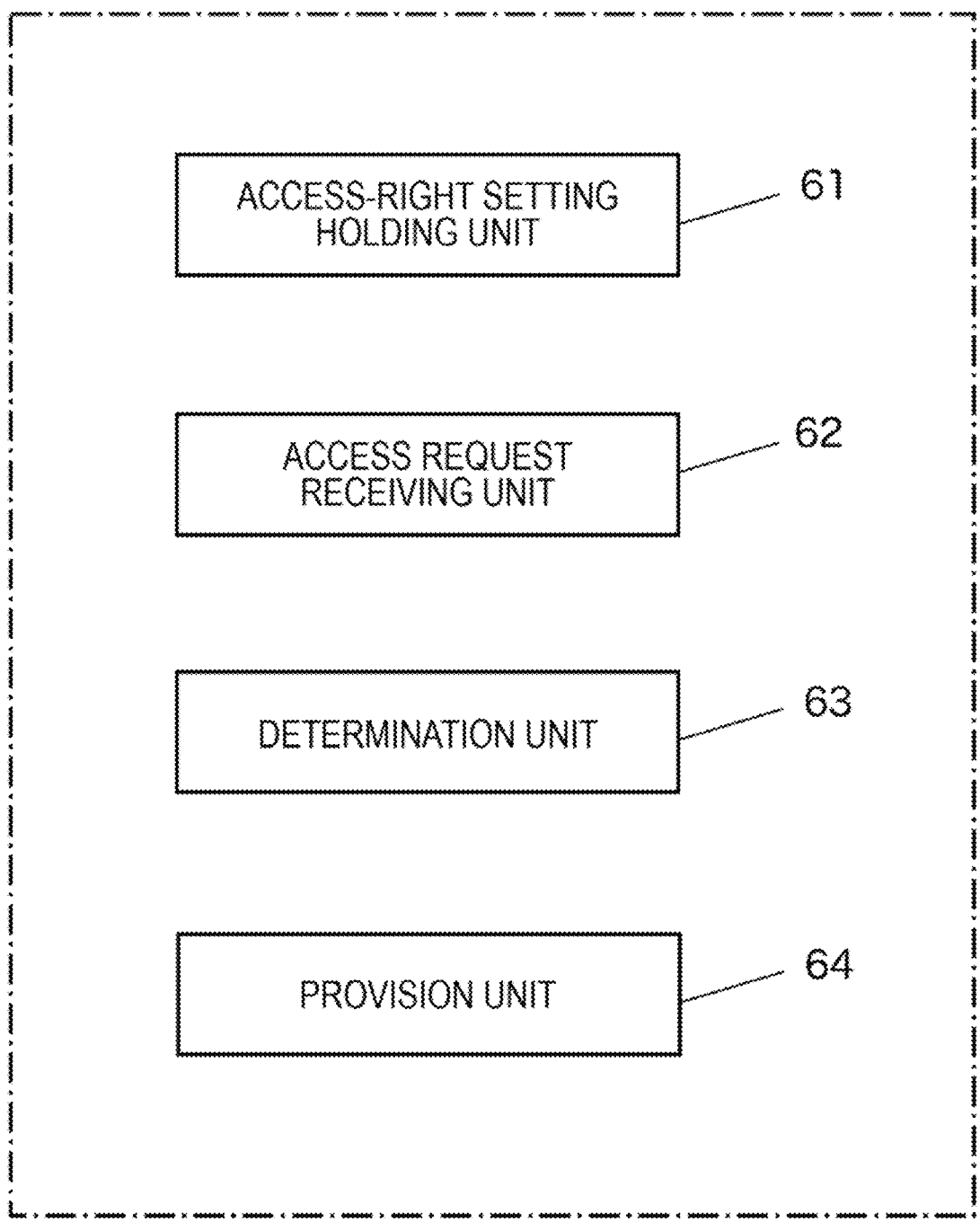
FIG. 5 is another functional block diagram of the control unit of the cloud management server according to the embodiment of the present disclosure.

Therefore, as shown in FIG. 5, the control unit 31 according to the present embodiment functionally includes an access-right setting holding unit 61, an access request receiving unit 62, a determination unit 63, and a provision unit 64.

The access-right setting holding unit 61 is configured to receive a setting of an access right from an owner of a storage device that is the user device 20. The access-right setting holding unit 61 finds out license information (L) in which the owner of the user device 20 is a subscriber or a sharer of the license from the license database 42. The access-right setting holding unit 61 holds the received setting of the access right in association with license identification information included in the license information (L) found out. The setting of the access right includes information indicating whether the subscriber and the sharer of the license identified by the license information (L) found out are permitted to load data in a cloud storage that is the cloud service server 10 relating to the license information (L).

Specifically, the setting of the access right is held with information (organization ID) identifying a person who has an access right (reading permission or the like) to data in the cloud service server 10 relating to the license identified by the associated license information (L) stored. The information may be stored in the storage unit 32 of the cloud management server 30 or may be stored in association with corresponding license information (L) in the license database 42.

The access request receiving unit 62 is configured to receive an access request to data stored in the cloud service server 10. The access request includes license identification information of the cloud service server 10, a URL of the cloud service server 10 that is an access destination, and the like.

The determination unit 63 is configured to determine whether a subscriber or a sharer of a license specified by the license identification information received by the access request receiving unit 62 is an owner of the user device 20 corresponding to the data relating to the access request.

Specifically, the determination unit 63 acquires an organization ID of a source of the access request received by the access request receiving unit 62 by authentication processing or the like. The determination unit 63 searches the device database 43 for the acquired organization ID. If the acquired organization ID cannot be found in the device database 43, the determination unit 63 determines that the source is not the owner of the user device 20 corresponding to the data relating to the access request and executes the following processing for confirming an access right (access-right confirming processing).

In the access-right confirming processing, the determination unit 63 refers to a setting of an access right which the access-right setting holding unit 61 holds in association with license identification information included in an access request to determine whether a source of the access request has an access right to data that is a target of the access request. If it is determined that the source of the access request does not have the access right, the determination unit 63 informs the source of the access request thereof. When it is determined that the source of the access request has the access right, the determination unit 63 outputs data provision instructions to the provision unit 64.

When the determination unit 63 finds out the acquired organization ID in the device database 43, the determination unit 63 acquires information identifying the user device 20 stored in association with the organization ID in the device database 43. The determination unit 63 determines whether or not a URL that is a target of the access request received by the access request receiving unit 62 is a storage service storing the data held by the user device 20, which is identified by the acquired information (a storage service onto which the user device 20, which is identified by the acquired information, backed up the data). If there is a plurality of user devices 20 identified by the acquired information, the determination unit may determine whether or not the URL is a storage device onto which any one of the user devices 20 backed up the data.

When it is determined that the URL that is the target of the access request received by the access request receiving unit 62 is not a backup destination of the data held by the user device 20, which is identified by the acquired information, the determination unit 63 executes the above-described access-right confirming processing.

When it is determined that the URL that is the target of the access request received by the access request receiving unit 62 is the backup destination of the data held by the user device 20, which identified by the acquired information, the determination unit 63 outputs data provision instructions to the provision unit 64.

When the provision unit 64 receives the data provision instructions from the determination unit 63, the provision unit 64 executes processing (provision processing) of acquiring a list (directory) of data stored correspondingly to the URL that is the target of the access request received by the access request receiving unit 62 or the data itself and providing the list or the data itself to the source of the access request.

In the present embodiment, a directory and data in the cloud service server 10 may be encrypted as decodable by a pass phrase (decryption key) preset for the corresponding user device 20 or for each piece of license information (L). An encryption key, for example, corresponding to the pass phrase is used in the encryption. The encryption may be performed in the user device 20 or as a service of the cloud service server 10.

The pass phrase may be designated, for example, by a user of an owner of the user device 20. The encryption key may be generated based on the designated pass phrase. The encryption key corresponding to the pass phrase designated by the user may be transmitted from the user device 20 to the cloud service server 10 by making the encryption key different from the pass phrase and making, by encryption, the encryption key unobtainable easily from the pass phrase.

In this case, when the provision unit 64 receives the data provision instructions from the determination unit 63, the provision unit 64 requests information (which may be the pass phrase itself or information necessary to acquire the pass phrase) identifying the pass phrase from the source of the access request received by the access request receiving unit 62. When the source of the access request inputs the information identifying the pass phrase in response to the request, the provision unit 64 acquires the directory and/or the data that is the target of the access request from the cloud service server 10.

The provision unit 64 attempts to decrypt the acquired directory and/or the data by the pass phrase identified by the information input by the provision source. When the data is decoded, the provision unit 64 transmits the directory and/or the data decoded to the source of the access request. If the directory and/or the data is not decoded, the provision unit 64 informs the source of the access request thereof.

Although the decryption is performed in the provision unit 64, the present embodiment is not limited thereto. The provision unit 64 may be configured to transmit the directory and/or the data encrypted to the source of the access request without requesting the source of the access request to input the information identifying the pass phrase.

The determination unit 63 may cause the provision unit 64 to perform the processing of providing the target of the access request without reconfirming the access right and re-requesting the pass phrase when the directory or the data that is the target of the access request received by the access request receiving unit 62 is selected from the directory (list of data and other directories) provided by the provision unit 64.

Operation

The cloud management server 30 of the present embodiment includes the above-described configuration and is configured to operate in the cloud system as follows. The following example assumes that the organization A entrusts management of an information device to the organization C and the organization C installs the user device 20, which is a storage device, in the organization A. That is, an owner of the user device 20 is the organization A.

The user device 20 functions as a NAS. The user device receives instructions to store data from a personal computer or the like of a user in the organization A via a local area network (LAN) in the organization A and stores data relating to the instructions. When the user device receives instructions to load data from the user, the user device loads data relating to the instructions to output the data to the personal computer or the like of the user.

The organization C orders a subscription (subscription of a license) from an organization S to use the cloud service server 10 as a backup storage of the user device 20 in place of the organization A. That is, the organization C is a license subscriber.

The organization C registers license information (L) in the cloud management server 30. The organizations A and C register as users in advance in the cloud management server 30. That is, organization IDs, user names, and authentication information, such as passwords of both the organizations A and C, are registered in the user database 41.

A user of the organization C accesses the cloud management server 30 via the network using the personal computer or the like and inputs license information (L) relating to a new license and information identifying the organization A as a license sharer (P). The license information (L) includes information (URL or the like) identifying an access destination for receiving a service on the cloud service server 10, authentication information for accessing the service, and information identifying the user device 20, which is installed in the organization A.

The cloud management server 30 associatively stores, based on the received information, the organization ID of the organization B, which is a license subscriber, the received license information (L), and organization ID of the organization A, which is the information (P) identifying a license sharer, in the license database 42.

The example assumes that the cloud management server 30 stores the subscriber (organization C) and the sharer (organization A) of the license identified by the stored information in association with information (a setting of an update authority) indicating they have an update authority in the license database 42.

The user of the organization C inputs information identifying the user device 20 installed and the organization ID of the organization A, which is the owner of the user device, and instructs the cloud management server 30 to register the user device 20 owned by the organization A.

According to the instructions, the cloud management server 30 stores the organization ID of the organization A in association with the information identifying the user device 20 in the device database 43.

The cloud management server 30 transmits the stored setting information of the license to the user device 20, which is identified by the information input by the user of the organization C. Specifically, the user device 20 accesses the cloud management server 30 every predetermined timing to check whether or not there is setting information, updated information, or the like addressed to the user device.

In the example, the cloud management server 30 operates as a web server and is configured to hold license information (L) included in the setting information of the license in association with the information identifying the user device 20 with the license information (L) accessible from the user device 20.

When the user device 20 installed in the organization A accesses the cloud management server 30, the user device 20 finds out and acquires license information (L) addressed to the user device 20. The user device 20 then applies content of the acquired license information (L) to its own configuration, thereby storing a UR L, authentication information, and the like of the cloud service server 10, which is a backup destination of data.

Figure 6:
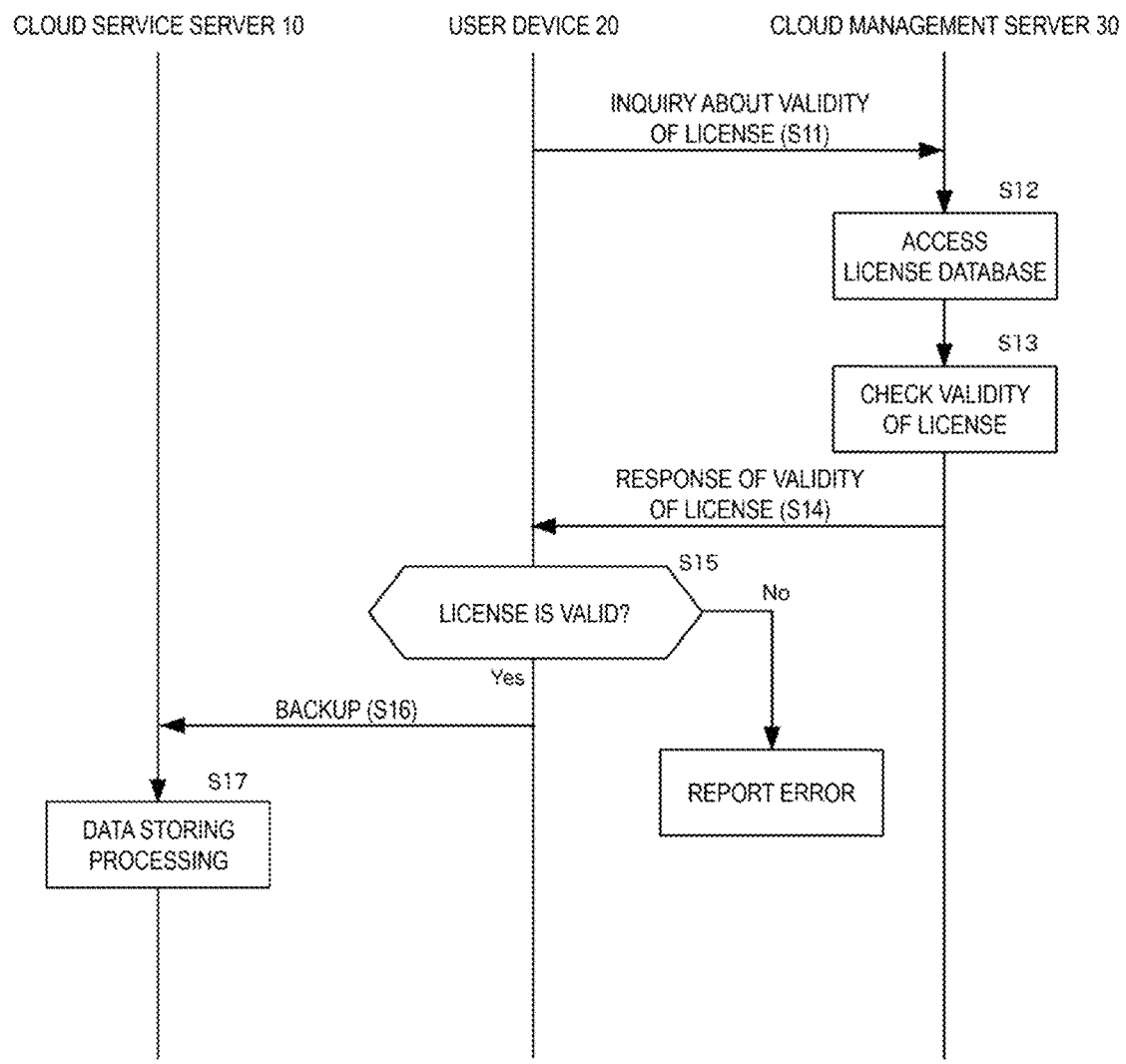
FIG. 6 is a flowchart showing an operation example of the cloud system according to the embodiment of the present disclosure.

The user device 20 starts backup processing every predetermined backup timing. In the backup processing, as shown in FIG. 6, the user device 20 inquires of the cloud management server 30 whether a license identified by the set license information (L) is valid or invalid (S11).

The cloud management server 30 acquires validity information (V) stored in the license database 42 in association with the license information relating to the inquiry (S12) to check whether or not the license is valid (S13). When it is determined that the license is valid, the cloud management server 30 transmits information indicating that the license is valid to the user device 20, which is the source of the inquiry (S14).

The user device 20 determines whether the information indicating that the license is valid is received (S15). When the license is valid, the user device 20 transmits data held in the user device 20 to the cloud service server 10 to perform the backup processing using the stored license information (L)(S16). If the license is not valid, the user device 20 reports an error.

The cloud service server 10 confirms the user device 20 with authentication information of the corresponding license information (L). When the authentication is successful, the cloud service server 10 stores the data transmitted by the user device 20 in a storage area correspondingly to the license identified by the license information (L) (S17: data storing processing). The cloud service server 10 may encrypt the to-be-stored data as decodable by a pass phrase predetermined with the corresponding license subscriber.

The user of the organization A, which is the owner of the user device 20, sets an access right. Specifically, the user of the organization A sets the cloud management server 30 to determine whether or not the user of the organization C, which is entrusted to manage the information device, is permitted to read the data.

When the cloud management server 30 receives the setting of the access right, the cloud management server 30 searches the license database 42 for license information (L) of a license whose subscriber or sharer is the organization A, which is the owner of the user device 20.

In the example, since found is a license whose subscriber is the organization C and whose sharer is the organization A, the cloud management server 30 loads license information (L) relating to the found license to store, in association with the loaded license information (L), the setting of the access right to permit the user of the organization C to read the data in the storage unit 32.

Figure 7:
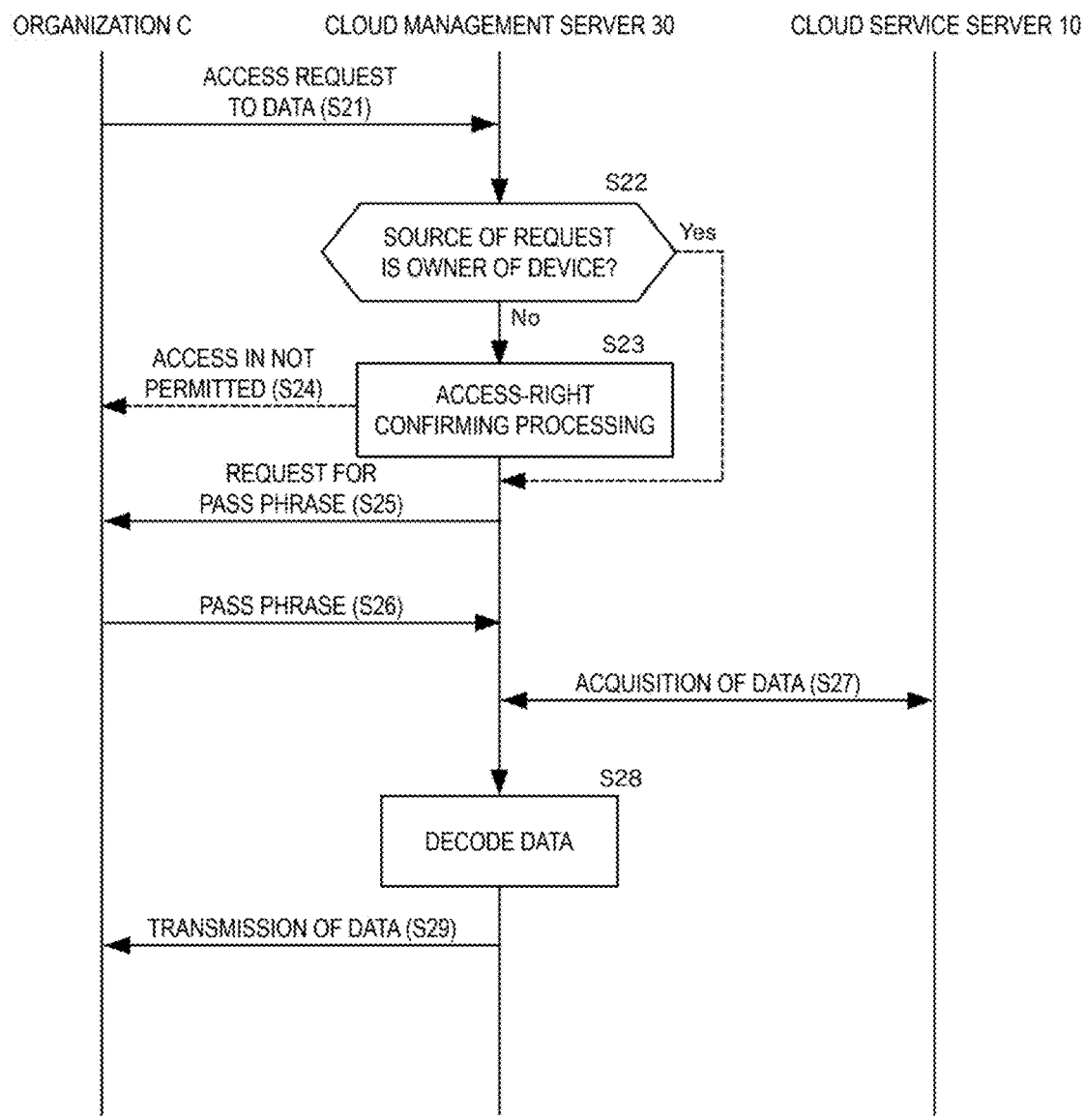
FIG. 7 is a flowchart showing another operation example of the cloud system according to the embodiment of the present disclosure.

For example, when restoring data from a backup, the user of the organization C requests the cloud management server 30 to access the data of the organization A stored in the cloud service server 10, as shown in FIG. 7 (S21). In the access request, license information (L) including a URL corresponding to the stored data is specified.

The cloud management server 30 determines whether or not the organization C, which is a source of the access request, is the owner of the user device 20 corresponding to the data relating to the access request (S22). Since an organization ID of the organization C cannot be found in the device database 43, the cloud management server 30 determines that the organization C is not the owner of the user device 20 corresponding to the data relating to the access request.

In this case, the cloud management server 30 starts the access-right confirming processing (S23) and load a setting of an access right associated with the license information (L) relating to the access request from the storage unit 32. The setting of the access right received from the user of the organization A (setting to permit the user of the organization C to read the data) is loaded first.

If the setting of the access right is not stored in the storage unit 32 or if it is determined that there is the setting of an access right but is no access right stored, the cloud management server 30 informs a source of the access request that the access is restricted (S24).

In the example, the cloud management server 30 determines that the organization C, which is the source of the access request, has an access right by the loaded setting of the access right. In FIG. 7, operation unexecuted in the example is shown with broken lines.

Determining that the organization C, which is the source of the access request, has the access right, the cloud management server 30 requests a pass phrase from the user of the organization C (S25). When the user of the organization C inputs the pass phrase in response to the request (S26), data (encrypted data) that is a target of the access request is acquired from the cloud service server 10 to the cloud management server 30 (S27).

The cloud management server 30 attempts to decode the data acquired from the cloud service server 10 using the pass phrase input by the user of the organization C in step S26 (S28). When the data is decoded, the cloud management server 30 transmits the decoded data to the user of the organization C (S29).

According to the example, the user of the organization C can access the backup data of the user device 20 of the organization A to acquire the data for restoration or the like. On the other hand, when the user of the organization A does not set the access right of reading permission for the organization C, the user of the organization C cannot access the backup data of the user device 20 of the organization A.

The organization C manages an expiration date and the like of a license relating to a subscription for the organization A. When the expiration date approaches, the organization C updates the license with the organization S. The organization C acquires update license information (L') by the update.

Figure 8:
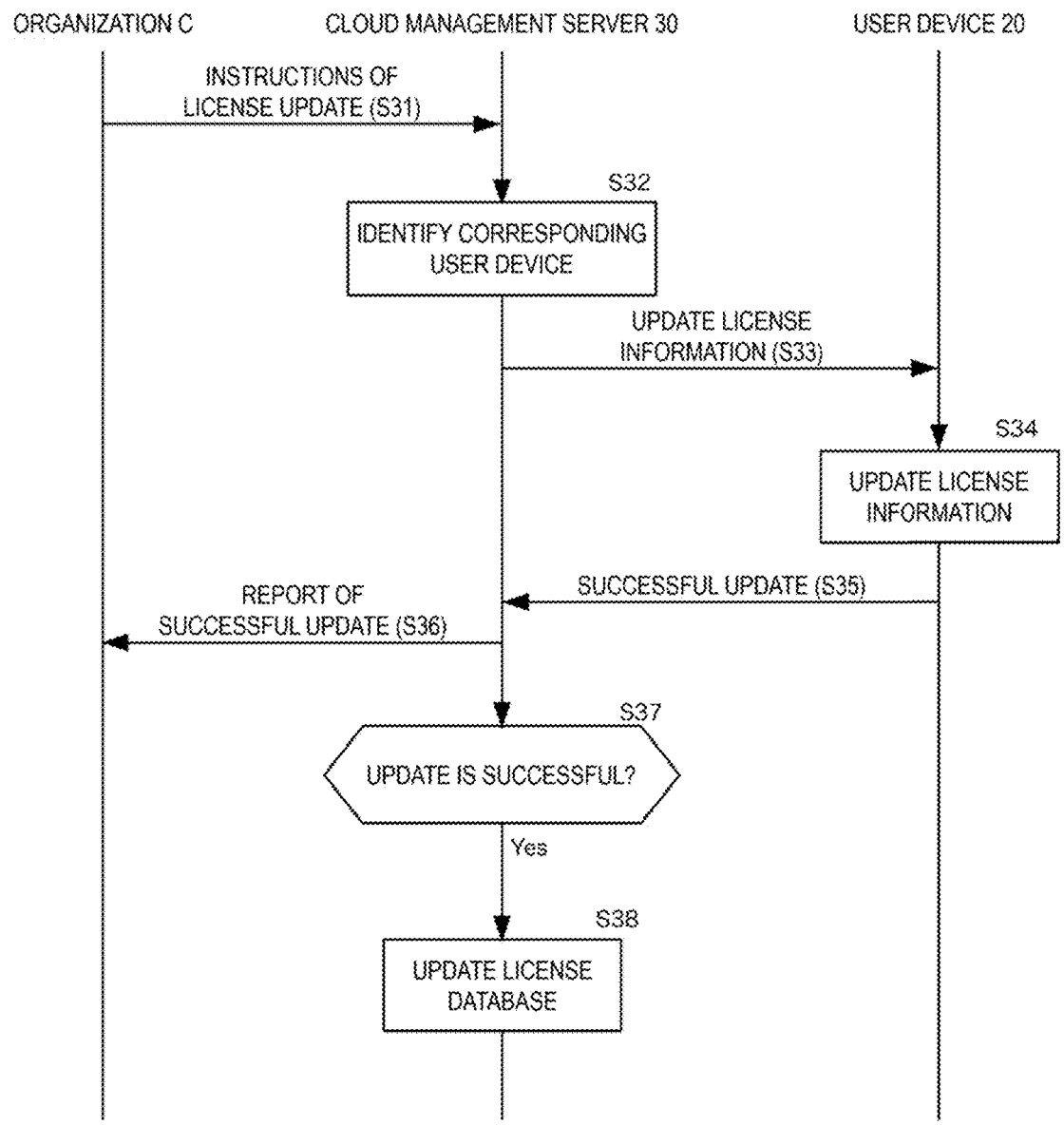
FIG. 8 is a flowchart showing still another operation example of the cloud system according to the embodiment of the present disclosure.

In order to update a license, as shown in FIG. 8, the user of the organization C accesses the cloud management server 30 to instruct, by inputting current (original) license information (L) and the update license information (L'), the cloud management server 30 to update the license (S31). The cloud management server 30 refers to the license database 42 to load update authority of the setting information relating to the update instructions. In the example, the update authority is given to a subscriber or a sharer of the license, and the subscriber of the license associated with the current license information (L) in the license database 42 is the organization C. Therefore, the cloud management server 30 determines that the organization C has the update authority of the license relating to the license information (L).

Therefore, the cloud management server 30 acquires information identifying the user device 20, which uses the license (S32). For example, when the information identifying the user device 20 is stored in association with the license information (L) in the license database 42, the cloud management server 30 may use the information. The cloud management server 30 may refer to the license database 42 to acquire information identifying a subscriber or a sharer of a license relating to license information (L) and then refer to the device database 43 to acquire information identifying the user device 20 owned by the subscriber or the sharer of the license identified by the acquired information.

The cloud management server 30 transmits the update license information (L') to the user device 20, which is identified by the acquired information (S33). As described above, the transmission of the license information (L') may be performed as follows: the license information is stored in association with the information identifying the user device 20; and the license information is transmitted in response to the request from the user device 20.

The user device 20 acquires the update license information (L') from the cloud management server 30 to apply content of the acquired license information (L') to its own configuration, thereby updating the license information (L) (S34). When the update of the license information (L) is successful, the user device 20 informs the cloud management server 30 thereof (S35).

The cloud management server 30 receives a result of the update of the license information (L) in the user device 20 to inform, of the result, the user of the organization C, who has instructed the update in step S31 (S36).

When the update result of the license information (L) in the user device 20 indicates that the update is successful (S37), the cloud management server 30 searches the license database 42 for information associated with the corresponding current license information (L) to overwrite the current license information (L) with the update license information (L'), thereby updating content of the license database 42 (S38).

If the update result of the license information (L) in the user device 20 does not indicate that the update is successful, the user of the organization C, who has instructed the update in step S31, is informed thereof (step S36) and the content of the license database 42 is not updated.

According to the present embodiment, the user of the organization A can entrust management of a license of a cloud service, for example, to the organization C. In addition, it is possible to determine whether or not the organization C has an access right to the data when the organization A backs up data onto the cloud service relating to the license. Therefore, measures against leakage of the data can be taken with the management of the license entrusted and management burdens for using the cloud service can be reduced.

A cloud management server according to one aspect of the present disclosure includes:
processing circuitry configured to
access a device database storing information identifying a storage device in association with information identifying an owner of the storage device;
access a license database associatively storing license information of a license for a cloud storage that is a backup destination of data in the storage device, information identifying a license subscriber of the license, and information identifying a license sharer who uses the cloud storage;
receive setting information about a first license from a first license subscriber;
refer to the device database to acquire information identifying a first storage device owned by the first license subscriber or owned by a first license sharer associated with the first license subscriber;
set an update authority of the setting information to at least one of the first license subscriber and the first license sharer; and
receive update instructions of the setting information, to refer to the update authority of the setting information, to confirm that the update instructions are given by the first license subscriber or the first license sharer having the update authority, and update the setting information.

According to the configuration, it is possible to manage update of a license relating to a cloud service by a subscriber or a sharer of the license, thereby management burdens for using the cloud service reduced.

The processing circuitry may be configured to transmit the received setting information to the first storage device identified using the information identifying the first storage device.

According to the configuration, it is possible to set a license for a storage device easily, thereby management burdens for using a cloud service reduced.

The processing circuitry may be configured to:
manage information about validity for each license relating to the license information in the license database; and
receive an inquiry from a second storage device, to acquire information identifying a first owner of the second storage device associated with information identifying the second storage device that is a source of the inquiry, to refer to the license database to acquire license information in which the first owner of the second storage device identified by the acquired information is a second license subscriber or a second license sharer, to determine whether a second license relating to the acquired license information is valid or invalid, and to inform the second license subscriber or the second license sharer whether the second license is valid or invalid.

According to the configuration, it is possible to provide information about validity of a license to a storage device.

The processing circuitry may be configured to:
receive, for a second license subscriber or a second license sharer identified by information in the license database from a first owner of a second storage device, a setting of an access right to data in the cloud storage relating to second license information stored in association with the second license information in which the first owner of the second storage device is the second license subscriber or the second license sharer and to hold the setting;
identify, from the second license subscriber or the second license sharer identified by the information in the license database, the second license information associated with information identifying the second license subscriber or the second license sharer as concerned information and, in a case where an access request to data in the cloud storage relating to the concerned information is received, determine whether or not the second license subscriber or the second license sharer who is a source of the access request is the first owner of the second storage device corresponding to the data in the cloud storage relating to the concerned information; and
in a case where the second license subscriber or the second license sharer who is the source of the access request is not the first owner of the second storage device, refer to the setting of the access right to determine whether or not the source of the access request has an access right to the data, and in a case where the source of the access request has the access right, receive a decryption key from the source of the access request to provide the source of the access request with data decoded using the decryption key corresponding to the data encrypted using an encryption key set correspondingly to the second storage device.

According to the configuration, an access right to data stored in a cloud storage is set in relation to a license, thereby management burdens for using a cloud service reduced.

A cloud system according to one aspect of the present disclosure includes:
a cloud management server; and
a plurality of storage devices, wherein
the cloud management server includes processing circuitry configured to
access a device database storing information identifying a storage device of the plurality of storage devices in association with information identifying an owner of the storage device,
access a license database associatively storing license information of a license for a cloud storage that is a backup destination of data in the storage device, information identifying a license subscriber of the license, and information identifying a license sharer who uses the cloud storage,
receive setting information about a first license from a first license subscriber,
refer to the device database to acquire information identifying a first storage device of the plurality of storage devices owned by the first license subscriber or owned by a first license sharer associated with the first license subscriber,
set an update authority of the setting information to at least one of the first license subscriber and the first license sharer, and
receive update instructions of the setting information, to refer to the update authority of the setting information, to confirm that the update instructions are given by the first license subscriber or the first license sharer having the update authority, and update the setting information.

According to the configuration, it is possible to manage update of a license relating to a cloud service by a subscriber or a sharer of the license, thereby management burdens for using the cloud service reduced.

A non-transitory computer-readable recording medium according to one aspect of the present disclosure includes executable instructions, which when executed by a computer cause the computer to:
access a device database storing information identifying a storage device in association with information identifying an owner of the storage device;
access a license database associatively storing license information of a license for a cloud storage that is a backup destination of data in the storage device, information identifying a license subscriber of the license, and information identifying a license sharer who uses the cloud storage;
receive setting information about a first license from a first license subscriber;
refer to the device database to acquire information identifying a first storage device owned by the first license subscriber or owned by a first license sharer associated with the first license subscriber;
set an update authority of the setting information to at least one of the first license subscriber and the first license sharer; and
receive update instructions of the setting information, to refer to the update authority of the setting information, to confirm that the update instructions are given by the first license subscriber or the first license sharer having the update authority, and update the setting information.

According to the configuration, it is possible to manage update of a license relating to a cloud service by a subscriber or a sharer of the license, thereby management burdens for using the cloud service reduced.

According to the present disclosure, it is possible to reduce management burdens for using a cloud service.

The invention claimed is:
1. A cloud management server, comprising:
processing circuitry configured to:
access a device database storing information identifying a storage device in association with information identifying an owner of the storage device;
access a license database associatively storing license information of a license for a cloud storage that is a backup destination of data in the storage device, infor- mation identifying a license subscriber of the license, and information identifying a license sharer who uses the cloud storage;

receive setting information about a first license from a first license subscriber;

refer to the device database to acquire information identifying a first storage device owned by the first license subscriber or owned by a first license sharer associated with the first license subscriber;

set an update authority of the setting information to at least one of the first license subscriber and the first license sharer; and receive update instructions of the setting information, to refer to the update authority of the setting information, to confirm that the update instructions are given by the first license subscriber or the first license sharer having the update authority, and update the setting information.

2. The cloud management server according to claim 1, wherein
the processing circuitry is configured to transmit the received setting information to the first storage device identified using the information identifying the first storage device.

3. The cloud management server according to claim 1, wherein
the processing circuitry is configured to:
manage information about validity for each license relating to the license information in the license database; and
receive an inquiry from a second storage device, to acquire information identifying a first owner of the second storage device associated with information identifying the second storage device that is a source of the inquiry, to refer to the license database to acquire license information in which the first owner of the second storage device identified by the acquired information is a second license subscriber or a second license sharer, to determine whether a second license relating to the acquired license information is valid or invalid, and to inform the second license subscriber or the second license sharer whether the second license is valid or invalid.

4. The cloud management server according to claim 3, wherein
the processing circuitry is configured to update the information about the validity every predetermined timing.

5. The cloud management server according to claim 1, wherein
the processing circuitry is configured to:
receive, for a second license subscriber or a second license sharer identified by information in the license database from a first owner of a second storage device, a setting of an access right to data in the cloud storage relating to second license information stored in association with the second license information in which the first owner of the second storage device is the second license subscriber or the second license sharer and to hold the setting;
identify, from the second license subscriber or the second license sharer identified by the information in the license database, the second license information associated with information identifying the second license subscriber or the second license sharer as concerned information and, in a case where an access request to data in the cloud storage relating to the concerned information is received, determine whether or not the second license subscriber or the second license sharer who is a source of the access request is the first owner of the second storage device corresponding to the data in the cloud storage relating to the concerned information; and in a case where the second license subscriber or the second license sharer who is the source of the access request is not the first owner of the second storage device, refer to the setting of the access right to determine whether or not the source of the access request has an access right to the data, and in a case where the source of the access request has the access right, receive a decryption key from the source of the access request to provide the source of the access request with data decoded using the decryption key corresponding to the data encrypted using an encryption key set correspondingly to the second storage device.

6. The cloud management server according to claim 5, wherein,
in a case where the second license subscriber or the second license sharer who is the source of the access request is the first owner of the second storage device, the processing circuitry receives a decryption key from the source of the access request to provide the source of the access request with data decoded using the decryption key corresponding to the data encrypted using an encryption key set correspondingly to the second storage device.

7. A cloud system, comprising:
a cloud management server; and
a plurality of storage devices, wherein
the cloud management server includes processing circuitry configured to:
access a device database storing information identifying a storage device of the plurality of storage devices in association with information identifying an owner of the storage device,
access a license database associatively storing license information of a license for a cloud storage that is a backup destination of data in the storage device, information identifying a license subscriber of the license, and information identifying a license sharer who uses the cloud storage,
receive setting information about a first license from a first license subscriber,
refer to the device database to acquire information identifying a first storage device of the plurality of storage devices owned by the first license subscriber or owned by a first license sharer associated with the first license subscriber,
set an update authority of the setting information to at least one of the first license subscriber and the first license sharer, and
receive update instructions of the setting information, to refer to the update authority of the setting information, to confirm that the update instructions are given by the first license subscriber or the first license sharer having the update authority, and update the setting information.

8. A non-transitory computer-readable recording medium including executable instructions, which when executed by a computer cause the computer to:
access a device database storing information identifying a storage device in association with information identifying an owner of the storage device;

access a license database associatively storing license information of a license for a cloud storage that is a backup destination of data in the storage device, information identifying a license subscriber of the license, and information identifying a license sharer who uses the cloud storage;

receive setting information about a first license from a first license subscriber;

refer to the device database to acquire information identifying a first storage device owned by the first license subscriber or owned by a first license sharer associated with the first license subscriber;

set an update authority of the setting information to at least one of the first license subscriber and the first license sharer; and receive update instructions of the setting information, to refer to the update authority of the setting information, to confirm that the update instructions are given by the first license subscriber or the first license sharer having the update authority, and update the setting information.

* * * * *